United States Patent

Haertle

[11] 3,948,387
[45] Apr. 6, 1976

[54] FABRIC PACKAGE FOR A VAPORIZABLE ANTI-STATIC AND FABRIC SOFTENING BAR

[75] Inventor: Richard J. Haertle, Brookfield, Wis.

[73] Assignee: Kleen Test Products, Inc., Milwaukee, Wis.

[22] Filed: June 25, 1973

[21] Appl. No.: 372,916

[52] U.S. Cl. .......................... 206/84; 53/14; 206/.5
[51] Int. Cl.² .................................. B65D 81/00
[58] Field of Search ............ 53/14, 28, 33; 206/.5, 206/46 PV, 84; 239/57; 252/8.6; 68/17 R; 34/60, 72; 66/202; 156/73

[56] References Cited
UNITED STATES PATENTS

| | | | |
|---|---|---|---|
| 1,387,839 | 8/1921 | Davis | 53/14 X |
| 2,313,058 | 3/1943 | Francis | 66/202 X |
| 2,334,256 | 11/1943 | Eaton | 53/14 |
| 2,812,593 | 11/1957 | Olthuis | 34/133 X |
| 2,987,857 | 6/1961 | Whelan | 53/14 |
| 3,036,616 | 5/1962 | Allen | 150/1 |
| 3,129,888 | 4/1964 | O'Hagan | 239/57 X |
| 3,142,109 | 7/1964 | Stoll | 66/202 X |
| 3,222,235 | 12/1965 | Buchner | 156/73 |
| 3,242,029 | 3/1966 | Deans | 29/470.3 |
| 3,321,068 | 5/1967 | Beach | 206/16.6 |
| 3,442,692 | 5/1969 | Gaiser | 8/149.2 X |
| 3,558,381 | 1/1971 | Colianni | 156/73 |
| 3,634,947 | 1/1972 | Furgal | 34/60 X |
| 3,651,615 | 3/1972 | Bohner | 156/73 X |
| 3,686,025 | 8/1972 | Morton | 252;117/8.6 X;120 |
| 3,749,620 | 7/1973 | Montgomery | 156/73 |
| 3,870,145 | 3/1975 | Mizuno | 206/.5 X |

OTHER PUBLICATIONS
R. C. Cheetham –Dying Fibre Blends, (Nostrand Ltd., London), 1966, pp. 252–254 & 259.

Primary Examiner—Travis S. McGehee
Assistant Examiner—John Sipos
Attorney, Agent, or Firm—Andrus, Sceales, Starke & Sawall

[57] ABSTRACT

An ultrasonically bonded fabric package for a vaporizable anti-static softening bar to be employed in an automatic dryer. To fabricate the package the bar is placed on a sheet of fabric consisting of approximately 60 to 70% Dacron and 30 to 40% cotton and the sheet is folded over to enclose the bar. The three open sides of the folded fabric are bonded together by applying pressure to the side edges in an amount of 20 to 40 psi, while subjecting the fabric to ultrasonic vibrations. A thermoplastic Velcro hook strip is bonded to the outer surface of the fabric envelope. The hook strip is adapted to engage a Velcro loop strip secured to the internal surface of the automatic dryer.

5 Claims, 5 Drawing Figures

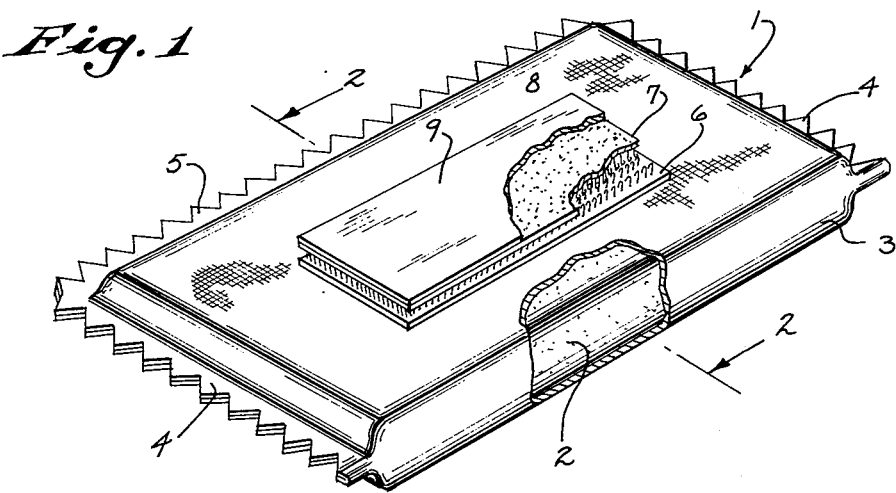
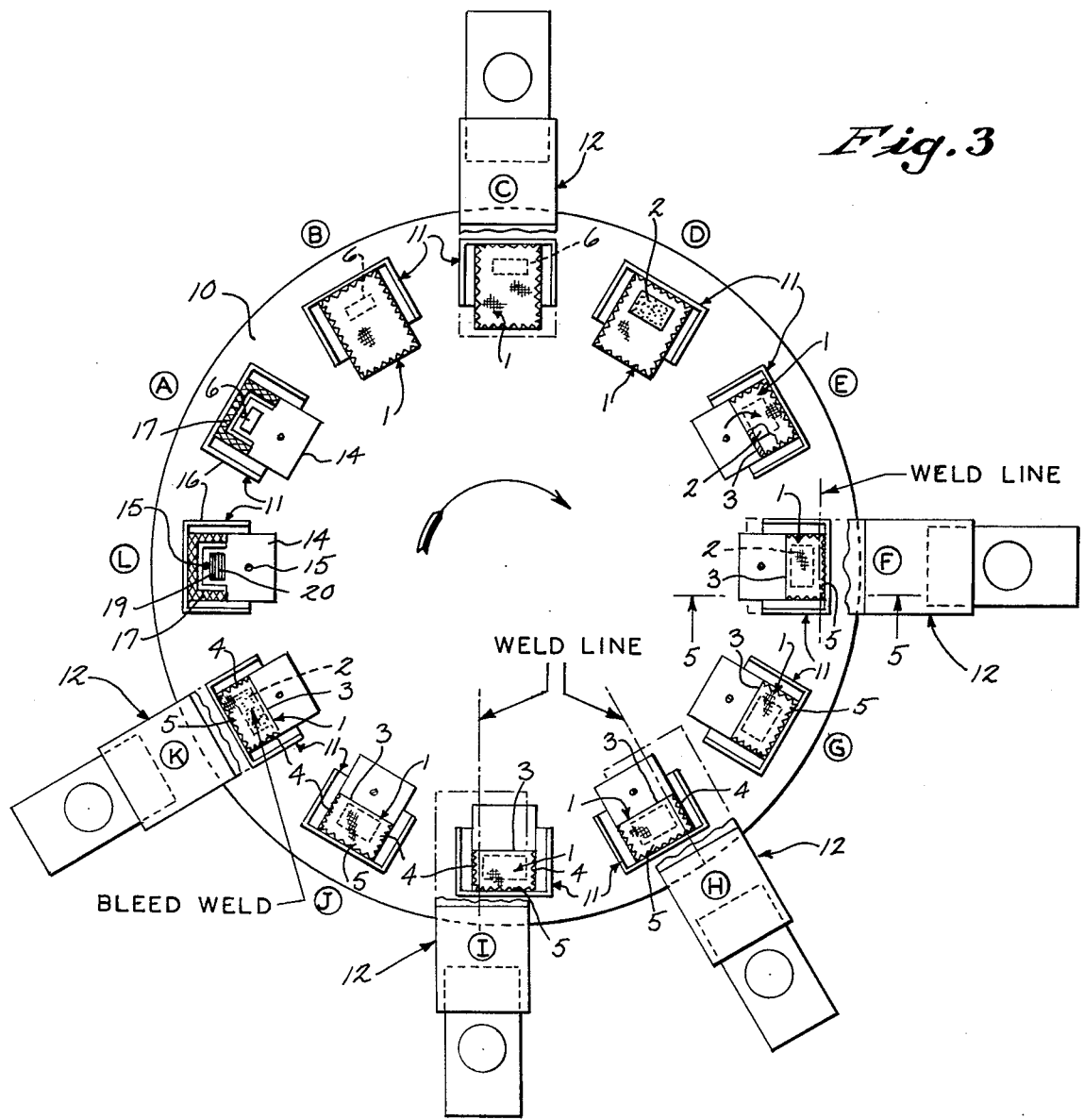

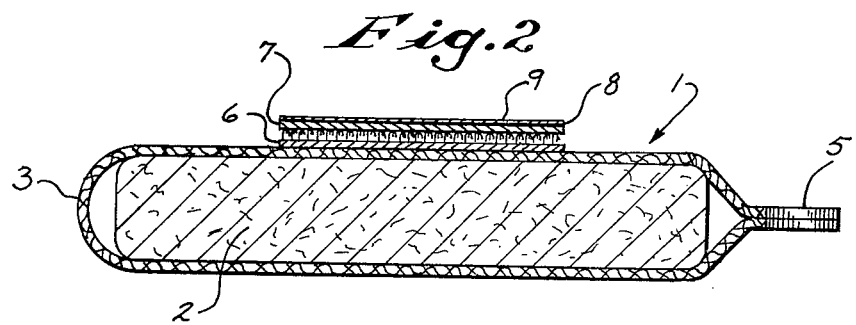
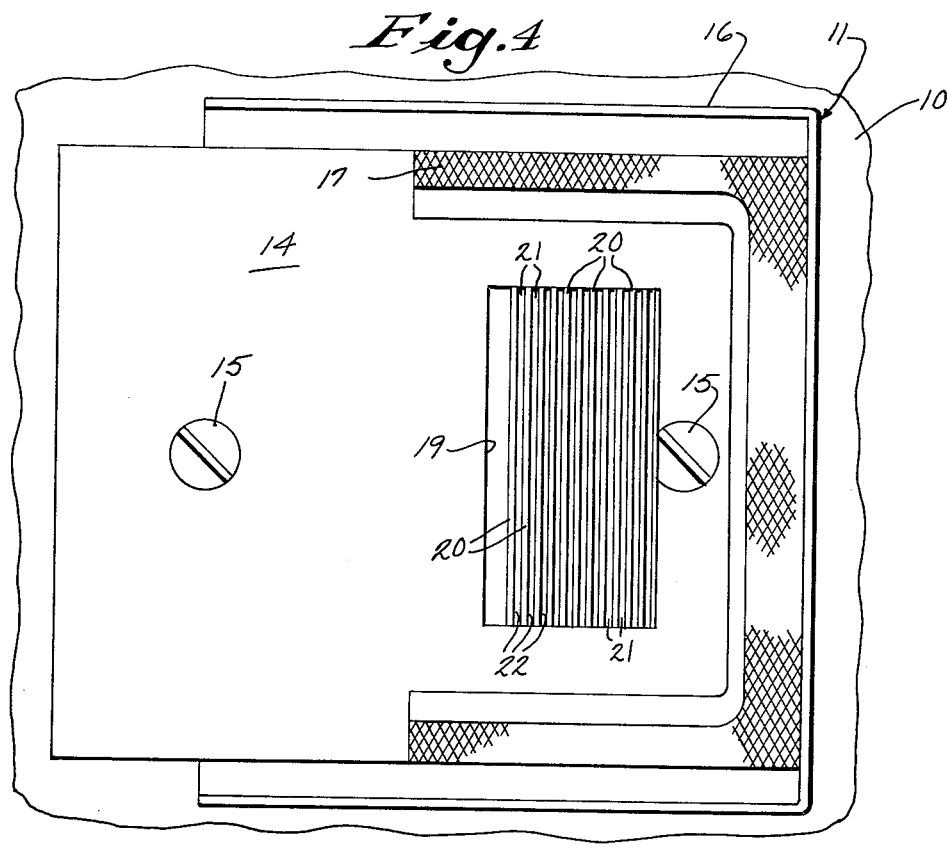
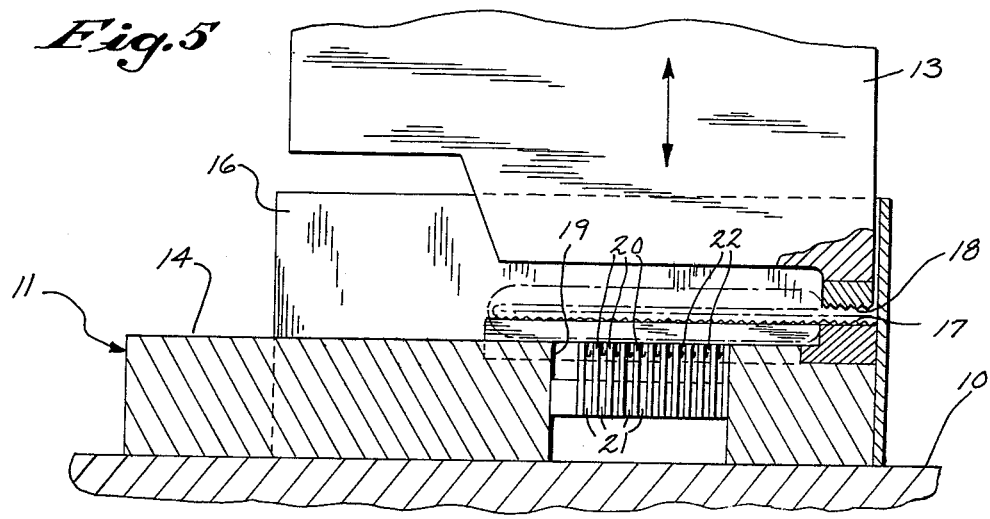

FABRIC PACKAGE FOR A VAPORIZABLE ANTI-STATIC AND FABRIC SOFTENING BAR

BACKGROUND OF THE INVENTION

In the past, liquid softening agents have been added to the wash water in automatic washing machines for the purpose of providing anti-static characteristics for the clothing and to provide a softening effect so that the wash or clothing after drying will have a fluffy characteristic. The addition of the liquid softening agents to the wash water had decided disadvantages in that the liquid agents are generally quite expensive and are discharged into the sewer lines or septic tanks with the wash water, thereby acting as a pollutant.

More recently, anti-static and fabric softening bars have been developed which, instead of being placed in the wash water during the washing cycle, are attached to the interior surface of the dryer during the drying cycle. At room temperature the bar is a solid mass having an appearance similar to a cake of soap, but at the temperature involved during the drying cycle, the bar will soften and vaporize with the vapor permeating the interior of the dryer to provide the anti-static and fabric softening effect.

The bar is normally enclosed within a porous fabric envelope or package. After enclosing the bar within the fabric the open side or sides of the fabric have normally been closed by stitching. Not only is stitching a time consuming manual operation which substantially increases the overall cost of the package, but leakage of the softened bar can occur through the stitched joint during the drying cycle.

SUMMARY OF THE INVENTION

The invention is directed to an improved ultrasonic bonded, fabric envelope or package for a vaporizable, anti-static fabric softener bar. In accordance with the invention, the bar is initially placed in a sheet of fabric composed of from 60 to 70% of synthetic thermoplastic fibers, such as Dacron, and 30 to 40% of cellulosic fibers, such as cotton. The sheet is then folded over to enclose the bar and the three open sides of the folded fabric are bonded together ultrasonically to provide a sealed envelope or package.

To provide the ultrasonic bonding, the edges of the fabric to be bonded together are positioned on a knurled surface of a die, and an ultrasonic horn, having a similarly knurled surface, is moved into contact with the overlapping fabric edge portions utilizing a pressure in the range of 20 to 40 psi. While subjected to this pressure, the edge portions of the fabric are exposed to ultrasonic vibrations of a magnitude sufficient to fuse the thermoplastic synthetic fibers and provide a sealed and bonded joint along the edge portion. The knurled surfaces on the die and the horn are arranged so that a ridge on one surface mates or registers with a groove on the other knurled surface, with the result the thermoplastic fibers are melted and an interlocking effect is achieved to provide the permanent and continuous bond along the edge.

As the ultrasonic bonding procedure of the invention eliminates the costly hand stitching operations used in the past and does not require the use of auxilliary adhesives, the overall cost of fabrication of the envelope is substantially reduced.

The process provides a continuous and sealed bond along the side edges of the package which prevents the molten bar at the temperature of drying from leaking through the joint, with the result that the vaporizing bar will be properly metered or distributed through the porous fabric to the interior of the dryer.

As an additional feature of the invention, the package, after sealing of the side edges, is subjected to a further ultrasonic treatment to melt the bar and cause the bar to bleed through the package. The bleed-through operation enables the bar to function immediately when positioned in the dryer and it is not necessary for the bar to undergo several heating cycles before the bar has melted sufficiently to permeate the fabric envelope.

Other objects and advantages will appear in the course of the following description.

DESCRIPTION OF THE DRAWINGS.

The drawings illustrate the best mode present contemplated of carrying out the invention.

In the drawings:

FIG. 1 is a perspective view of the fabric envelope of the invention;

FIG. 2 is a transverse section taken along line 2—2 of the envelope;

FIG. 3 is a schematic plan view showing the rotating turret and the fixtures used in the fabrication of the envelope;

FIG. 4 is a plan view of one of the fixtures employed in the turret with the fabric envelope removed; and FIG. 5 is a vertical section of a fixture with an edge of the envelope being sealed.

DESCRIPTION OF THE PREFERRED EMBODIMENT

FIGS. 1 and 2 illustrate an ultrasonically bonded, fabric package or envelope 1 for a vaporizable, anti-static and fabric softening bar 2. The fabric envelope is a single sheet of fabric which is folded along the edge 3, and the end edges 4, as well as the longitudinal side edge 5 of the envelope are bonded together ultrasonically to provide a sealed package.

A Velcro hook strip 6 formed of thermoplastic material, such as nylon, is bonded to the outer surface of the envelope 1, and is engaged with a Velcro loop strip 7, similarly formed of a thermoplastic material, such as nylon. The outer surface of the strip 7 is provided with a layer of an adhesive 8 which is covered with a sheet of release paper 9. At the time of use, the release paper 9 is removed and the strip 7 is pressed against the internal surface of the dryer drum, causing the pressure sensitive adhesive layer 8 to firmly bond the strip 7 to the dryer drum surface. After a period of use, the bar 2 will be completely vaporized and the spent envelope can be removed from the dryer by detaching the hook strip 6 from the loop strip 7 attached to the dryer, and attaching the hook strip 6 of a replacement envelope to the loop strip 7 attached to the dryer surface.

The envelope 1 is formed of a permeable, woven fabric composed of about 60 to 70% of a thermoplastic synthetic fibers, such as polyester fibers (Dacron), and about 30 to 40% by weight of cellulosic fibers, such as cotton. This composition for the fabric envelope is important to the invention. The cellulosic fibers being absorbent will increase the rate of bleed-through of the bar 2, while the synthetic fibers provide heat and abrasion resistance as well as weldability for the envelope. Thus, the above proportion of synthetic and cellulosic fibers provides an optimum balance of weldability heat and abrasion resistance and bleed-through for the envelope.

As shown in FIG. 1, the edges of the fabric envelope can be serrated, but this is not essential to the invention.

The apparatus for fabricating the envelope 1 is illustrated schematically in FIG. 3 and comprises a turret 10 which is adapted to rotate about a vertical axis. A group of fixtures 11 are mounted on the turret and each fixture is adpated to be indexed through a series of stations, indicated in FIG. 3 as A to L. The various working operations in the fabrication of the envelope are performed as each of the fixtures is indexed through the stations.

Conventional ultrasonic welding units, indicated generally by 12 are located at stations C, F, H, I and K. Each welding unit includes a horn 13 which is adapted to be moved downwardly toward the fixture 11 at that particular station and to be retracted upwardly after the welding operation has been completed. The specific structure and operation of the welding units is not critical to the invention and any standard ultrasonic welding unit can be utilized.

Each of the fixtures 11 comprises a generally rectangular base plate 14, which is secured to the upper surface of the turret 10 by a pair of screws 5. A generally U-shaped flange or frame 16 extends upwardly from the base plate 14 and encloses a generally U-shaped die surface 17 which is raised above the level of the plate 14. As illustrated in FIG. 4, the die surface 17 is knurled and provided with a series of intersecting grooves. The lower surface 18 of the horns 13, which are located at stations F, H and I are similarly knurled and are arranged so that the ridges of the knurled surfaces 17 mate with the grooves in the knurled surfaces 18.

As illustrated in FIG. 4 and 5, each of the base plates 14 is provided with a central recess 19 and a series of strips 20 are located within the recess and are separated by spacers 21 to provide spaces or clearances 22. The upper edges of the strips 20 as shown in FIg. 5, are generally flush with the upper surface of the plate 14.

During the first step in the operation of the fabrication of the envelope, the rows of hooks of the hook strip 6 are inserted within the spaces 22 between the strips 20 in the fixture at station A, so that the backing portion of strip 6 will lie flat against the base plate 14, as illustrated in FIG. 5.

The turret is then indexed and at Station B the fabric sheet is placed on the base plate 14 covering the hook strip 6. The turret is again indexed moving the fixture to station C. The horn 13 of welding unit 12 located at station C has a generally smooth lower surface with dimensions substantially the same as the hook strip 6. The horn 13 is forced downwardly into contact with the fabric with a pressure in the range of 20 to 50psi and preferably about 30 psi. The horn is then energized for a period of 0.5 to 2.0 seconds, and preferably about 1.5 seconds, based on a frequency of 20,000 megacycles. After this period of exposure to the ulstrasonic vibrations, the vibrations are terminated and the pressure is retained for a period up to 2 seconds and preferably about 0.3 second, thereby resulting in a bond between the strip 6 and the fabric sheet.

The turret is then indexed to move the fixture to station D where the bar 2 is placed on the fabric. The fixture is then moved to station E where the fabric is folded over the bar. Following the folding of the fabric, the turret is again indexed to move the fixture to station F where a second ultrasonic unit 12 is employed to bond or weld the long edge 5 of the fabric envelope. At this station the downwardly facing surface of the horn 13 is provided with a knurled surface 18 which is adapted to register with the knurled die surface 17. At station F a pressure of about 10 to 30 psi is employed with about 20 psi being preferred and the overlapped fabric edges, while held under this pressure, are subjected to the ultrasonic vibrations for a period of 0.5 to 2.0 seconds and preferably about 1.5 seconds based on a frequency of 20,000 megacycles. Following this period of exposure to the ultrasonic frequency, the edges are maintained under pressure for a period up to 3 seconds and generally about 0.5 second to complete the bonding operation. Following the bonding of the longitudinal edge 5, the turret is again indexed to move the fixture to station G where no working action takes place.

The next indexing moves the fixture to station H where one of the short or end edges 4 is bonded by use of the ultrasonic welding unit 12 at that station. The downwardly facing surface of the horn 13 of the welder at station H has a knurled surface 18 which mates or registers with the knurled die surface 17 of the fixture. During this weld a pressure in the range of 15 to 30 psi and preferably 20 psi, is employed and a weld time of 0.5 to 2.5 second, and preferably about 1.25 seconds, is utilized. Following the welding, the edges are held under pressure for a period up to 2 seconds and generally about 0.25 second.

The turret is then again indexed to position the fixture at station I where the second end edge 4 is welded under similar conditions as those employed at station H.

With all of the side edges of the envelope welded or bonded together to enclose the bar 2, the turret is rotated to position the fixture at position J where no working operation is performed. The turret is then again indexed to position the fixture at station K where an ultrasonic welding unit 12 is employed to partially melt the bar within the package and cause the molten bar to bleed through the fabric. At this station the lower surface of the horn 12 is generally smooth and has an area slightly less than the area of the upper surface of envelope or package. A pressure in the range of about 20 to 40 psi and preferably 30 psi is employed for this operation and the package is subjected to the ultransonic vibrations for a period up to 4 seconds and generally about 2.5 seconds based on a frequency of 20,000 megacycles. After this ultrasonic treatment the package is retained under pressure without vibration for a period up to 3 seconds and generally about 0.3 second. The ultrasonic treatment at station K causes the bar to partially melt and the molten material oozes or permeates through the fabric envelope. This enables the envelope, when placed in the dryer, to immediately be effective in providing the anti-static and fabric softening effect. If the bleed-through operation was not employed it would be necessary for the envelope to undergo a number of dryer cycles before the bar would sufficiently melt and bleed through to provide the desired vaporizing effect in the dryer Following the bleed through operation at station K, the turret is again indexed moving the fixture to station L where the completed envelope is removed.

During the ultrasonic bonding of the side edges of the fabric that occurs at stations F, H and I, a temperature of about 500°F is developed. At this temperature and pressure the synthetic fibers will melt, although the cellulosic or cotton fibers will not melt or char. The melting of the synthetic fibers in combination with the mating knurled surfaces provides an interlocking action resulting in a positive and continuous seal for the entire edge of the package. As the sealing is achieved without the use of costly hand stitching, and as no auxiliary adhesives are needed to bond the edges of the envelopes together, a substantial reduction in cost is achieved.

Various modes of carrying out the invention are contemplated as being within the scope of the following claims particularly pointing out and distinctl claiming the subject matter which is regarded as the invention.

I claim:

1. A package, comprising a solid antistatic and fabric softening material capable of vaporizing at elevated temperatures, and an envelope enclosing the material, said envelope being formed of a woven fabric composed of 60 to 70% by weight of thermoplastic synthetic fibers and 30 to 40% by weight of cellulosic fibers, said package produced by positioning the material between layers of said fabric, said layers having overlapping unjoined peripheral edge portions, applying pressure to the overlapping peripheral edge portions and subjecting the overlapping edge portions to ultrasonic vibrations to develop a temperature in said overlapping edge portion sufficiently high to melt said synthetic fibers and below the decomposition temperature of the cellulosic fibers to thereby provide a sealed bond between said edge portions. ng the overlapping edge portions to ultrasonic vibrations to develop a temperature in said overlapping edge portion sufficiently high to melt said synthetic fibers and below the decomposition temperature of the celluosic fibers to thereby provide a sealed bond between said edge portions.

2. The package of claim 1, wherein the synthetic fibers are polyester and said cellulosic fibers are cotton.

3. The package of claim 1, and including a thermoplastic hook strip bonded to the outer surface of said envelope, said hook strip having a plurality of outwardly extending hook members adapted to engage loop members on a loop strip attached to the internal surface of a dryer.

4. The package of claim 1, wherein a portion of said solid material is impregnated in said fabric envelope.

5. The package of claim 1, and including attaching means connected to a surface of said envelope for attaching the envelope to the internal surface of a dryer, a portion of said solid material being impregnated in an area of said envelope located on the opposite side of the envelope from said attaching means.

* * * * *

UNITED STATES PATENT AND TRADEMARK OFFICE
CERTIFICATE OF CORRECTION

PATENT NO. : 3,948,387
DATED : April 6, 1976.
INVENTOR(S) : RICHARD J. HAERTLE

It is certified that error appears in the above-identified patent and that said Letters Patent are hereby corrected as shown below:

Column 6, line 4, After "portions." delete "ng the overlapping edge portions to ultrasonic vibrations to develop a temperature in said overlapping edge portion sufficiently high to melt said synthetic fibers and below the decomposition temperature of the celluosic fibers to thereby provide a sealed bond between said edge portions."

Signed and Sealed this

Seventeenth Day of August 1976

[SEAL]

Attest:

RUTH C. MASON
*Attesting Officer*

C. MARSHALL DANN
*Commissioner of Patents and Trademarks*